(12) United States Patent
Nakamura et al.

(10) Patent No.: US 6,875,140 B2
(45) Date of Patent: Apr. 5, 2005

(54) ENGINE AUXILIARY UNIT DRIVING EQUIPMENT

(75) Inventors: Shigenobu Nakamura, Anjo (JP); Hitoshi Irie, Nagoya (JP); Atsuo Ishizuka, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 10/041,634

(22) Filed: Jan. 10, 2002

(65) Prior Publication Data

US 2002/0094896 A1 Jul. 18, 2002

(30) Foreign Application Priority Data

Jan. 16, 2001 (JP) ........................................ 2001-008111

(51) Int. Cl.[7] ................................................. F16H 7/00
(52) U.S. Cl. ........................ 474/88; 474/153; 474/202; 474/238
(58) Field of Search ................................ 474/237, 238, 474/260, 202, 152, 153, 88, 168, 169, 170, 174, 175, 176, 159

(56) References Cited

U.S. PATENT DOCUMENTS

| | | | | |
|---|---|---|---|---|
| 1,662,511 A | * | 3/1928 | Geist | 474/84 |
| 2,082,540 A | * | 6/1937 | Geare | 474/84 |
| 2,442,037 A | * | 5/1948 | Cater et al. | 474/250 |
| 2,471,969 A | * | 5/1949 | Meyer | 474/238 |
| 2,841,020 A | * | 7/1958 | Van Deventer | 474/168 |
| 2,860,519 A | * | 11/1958 | Cavanaugh | 474/70 |
| 3,404,577 A | * | 10/1968 | Zahn | 474/238 |
| 3,948,113 A | * | 4/1976 | Stork | 474/238 |
| 4,945,272 A | | 7/1990 | Ochi et al. | 310/91 |
| 5,026,327 A | * | 6/1991 | White et al. | 474/152 |
| 5,827,143 A | * | 10/1998 | Monahan et al. | 474/73 |

FOREIGN PATENT DOCUMENTS

| | | | | |
|---|---|---|---|---|
| JP | 10-2402 A | * | 1/1998 | ........... F16H/55/49 |
| JP | A 2000-130563 | | 5/2000 | |

* cited by examiner

Primary Examiner—David A. Bucci
Assistant Examiner—Bradley J. Van Pelt
(74) Attorney, Agent, or Firm—Oliff & Berridge, PLC

(57) ABSTRACT

Engine auxiliary unit driving equipment for transmitting an engine driving force from a crank pulley to a plurality of engine auxiliary units include an alternator and a driven poly-V pulley, provided at least in the alternator, has a plurality of grooves extending in a circumferential direction. A poly-V belt, which has a plurality of projections extending in a longitudinal direction to correspond to grooves of the poly-V pulley, bridges between a crank pulley and the poly-V pulley. The poly-V belt is substantially divided in an axial direction of the driven poly-V pulley into two pieces each having plural pieces of the projections. Accordingly, a tensile strength acting in a width direction of the poly-V belt is substantially divided midway between the divided poly-V belts to reduce cracking in the round poly-V belt, resulting in longer life of the poly-V belt.

8 Claims, 5 Drawing Sheets

ENGINE AUXILIARY UNIT DRIVING EQUIPMENT

CROSS REFERENCE TO RELATED APPLICATION

This application is based upon and claims the benefit of priority of Japanese Patent Application No. 2001-8111 filed on Jan. 16, 2001, the content of which is incorporated herein by reference.

BACKGROUND OF THE INVENTION

1. Field of the Invention

The present invention relates to an engine auxiliary unit driving equipment for a vehicle such as a passenger car and a truck, in which engine driving force is transmitted from a crank pulley fixed to an engine crankshaft, via a belt, to each driven pulley of a plurality of engine auxiliary units.

2. Description of Related Art

It is a recent tendency that a driving torque for operating engine auxiliary units is higher as each of the engine auxiliary units is required to generate a larger output. For example, an alternator for a vehicle is required to have a higher power generation capacity since electric loads, typically, due to various safety control devices are newly demanded.

To cope with the requirement of the driving torque increase, a poly V pulley having a multi number of V shaped grooves and a poly V belt having a multi number of V shaped projections, which contact each other with larger contact areas, have been widely used for driving the respective engine auxiliary units without a slip between the pulley and the belt. To transmit higher driving torque, which is highly demanded recently, it is contemplated to more increase the contact areas of the pulley and the belt in such a manner that a winding or overlapping angle at which the pulley and the belt come in contact with each other is enlarged or a piece number of grooves of the pulley and a piece number of projections of the belt are increased.

However, a space of an engine room is getting smaller to achieve a slant nose shape of a vehicle body, which reduces a cruising resistance of the vehicle and brings a lower fuel consumption, or to secure a larger passenger room space. Accordingly, a freedom of layout of the respective engine auxiliary units in the engine room is restricted so that it is very difficult for each of the pulleys and the belt to be arranged so as to have more enlarged winding angle. On the other hand, the pulley and belt whose respective piece numbers of grooves and projections are more increased have been put into use even in a compact passenger car, as exemplified by an alternator disclosed in JP-Y2-6-6688 in which a poly-V pulley thereof has six or more pieces of grooves.

Further, an inertia force of each rotor of the engine auxiliary units, which is fixed to the driven pulley and rotatable together therewith, becomes larger. Accordingly, at a time when an engine revolution largely varies due to an explosion stroke of the engine, typically, at an idling time when the engine revolution is low and unstable, the inertia force of each rotor of the engine auxiliary units is operative to increase a speed of the belt, which is to be reduced by a speed reduction of the crank pulley.

This will cause to fluctuate tension of the belt in a longitudinal direction and to flap the belt. When a tension fluctuation frequency is substantially coincident with a natural frequency that is defined by a distance between pulleys, a mass per unit length of the belt and so on, a resonance is likely to occur, causing the larger belt flapping that results in enhancing belt noises and shortening life time of the belt. In particular, in the alternator that is one of the various engine auxiliary units, whose entire body has been enlarged to meet the demand of larger electric load, a weight of a rotor coil has been gained to produce a larger magnetic force, resulting in increasing the inertia of the rotor. Accordingly, the larger belt flapping, or the resonance, is likely to occur more frequently in the belt around the pulley of the alternator.

To solve this drawback, an alternator that is provided with a clutch pulley having a one-way clutch mechanism is proposed, as disclosed in JP-A-2000-130563. With this construction, the clutch mechanism is locked at an engine acceleration so that the engine torque is transmitted to the alternator but is raced at an engine deceleration so that the inertia of the rotor of the alternator is not transmitted to the belt.

Further, the pulley is attached to each of the engine auxiliary units with a so-called 'overhang' arrangement in which the belt tension is applied to a position away from each main body of the engine auxiliary units. Accordingly, a moment load applied to the pulley causes to incline the pulley in an exerting direction of the belt tension. Therefore, the belt that puts on the respective pulleys rotates in such a bevel shape that a round length of the belt on a width side away from each main body of the engine auxiliary units is shorter than that on a width side near thereto, as shown in FIG. 9. As the piece number of grooves of the poly-V-pulley increases, the bevel shape becomes more distinctly slanted one.

Since the round length of the belt on one width side becomes different from that on the other width side, tensile strength produced in a width direction as shown by arrows in FIG. 9 act on the belt. If the belt tension in a longitudinal direction is increased to lower the belt slip, the tensile strength produced in a width direction becomes larger. As a plurality of core wires extending in a longitudinal direction are embedded in the belt, the belt has a sufficient resistance against tensile strength acting in the longitudinal direction. However, the belt does not have a sufficient resistance against the tensile strength acting in a width direction so that there likely occurs a crack in the belt due to the tensile strength in a width direction, resulting in shortening a lifetime of the belt.

Moreover, the clutch pulley disclosed in JP-A-2000-130563 has an advantage that the tension fluctuation is limited and the flapping of the poly-V belt is restricted since the inertia of the rotor is not transmitted to the poly-V belt. However, the clutch pulley is composed of many parts such as rollers, springs and bearings and the manufacturing processes including heat treatment and assembly processes are complicated so that the clutch pulley can not be manufactured at a lower cost.

SUMMARY OF THE INVENTION

An object of the invention is to provide an engine auxiliary unit driving equipment in which a poly-V belt has a longer lifetime, a belt noise due to the belt flapping is smaller and its manufacturing cost is lower.

To achieve the above object, in an engine auxiliary unit driving equipment for transmitting an engine driving force from a crank pulley fixed to an engine crankshaft to a plurality of engine auxiliary units, one of which is an alternator for a vehicle, the alternator is provided with a driven poly-V pulley having a plurality of grooves extending in a circumferential direction. A poly-V belt, which has a plurality of projections extending in a longitudinal direction so as to correspond to the grooves of the driven poly-V pulley, bridges between the crank pulley and the driven poly-V pulley so that the engine driving force is transmitted, via the poly-V belt, the driven poly-V pulley. The poly-V belt is composed of a plurality of pieces substantially divided in an axial direction of the driven poly-V pulley so that each piece of the divided poly-V belts has a plurality of projections extending in a longitudinal direction.

With the equipment mentioned above, a tensile strength acting in a width direction of the poly-V belt is substantially divided midway between adjacent pieces of the divided poly-V belt so that cracks in the round poly-V belt hardly occurs, resulting in securing a longer lifetime of the poly-V belt. Further, shifting a value of natural frequency of the poly-V belt around the alternator serves to limit a belt flapping increase due to resonance at an idling time when a revolution fluctuation is larger. Moreover, revolutions or tensions of respective pieces of the divided poly-V belts are not same to each other so that the respective pieces of the divided poly-V belt hardly resonate at the same time. Accordingly, the lifetime of the poly-V belt becomes longer and the belt flapping noise can be reduced at a lower cost without using the conventional clutch pulley.

It is preferable that another of the engine auxiliary units other than the alternator is provided with another driven poly-V pulley on which the respective pieces of the divided ploy-V belts are wound in parallel on the another driven poly-V pulley to extend perpendicularly to the axial direction thereof so that the engine driving force is transmitted from the crank pulley, via the respective pieces of the divided poly-V belts, not only to the alternator but also to the another of the engine auxiliary units.

Further, preferably, confronting side surfaces of any adjacent pieces of the divided poly-V belts come in contact with each other. When one of the adjacent pieces of the divided poly-V belts is about to flap, the other of the adjacent pieces of the divided poly-V belts serves to restrict flapping movement of the one of adjacent pieces of the divided poly-V belts since the confronting side surfaces thereof come in contact with each other. Accordingly, this construction results in lowering belt noises due to the belt flapping and securing longer lifetime of the poly-V belt.

Furthermore, it is preferable that the adjacent pieces of the divided poly-V belts are joined with a resilient member whose stiffness is remarkably lower than that of the poly-V belt. With this construction, an installation work for putting the poly-V belt on the poly-V pulleys is simpler so that a total manufacturing cost of the vehicle is lower.

Moreover, preferably, respective longitudinal lengths or weights per unit length of the divided poly-V belts are different so that the respective divided poly-V belts are prevented from resonating at the same frequency.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

First Embodiment

Figure 1:
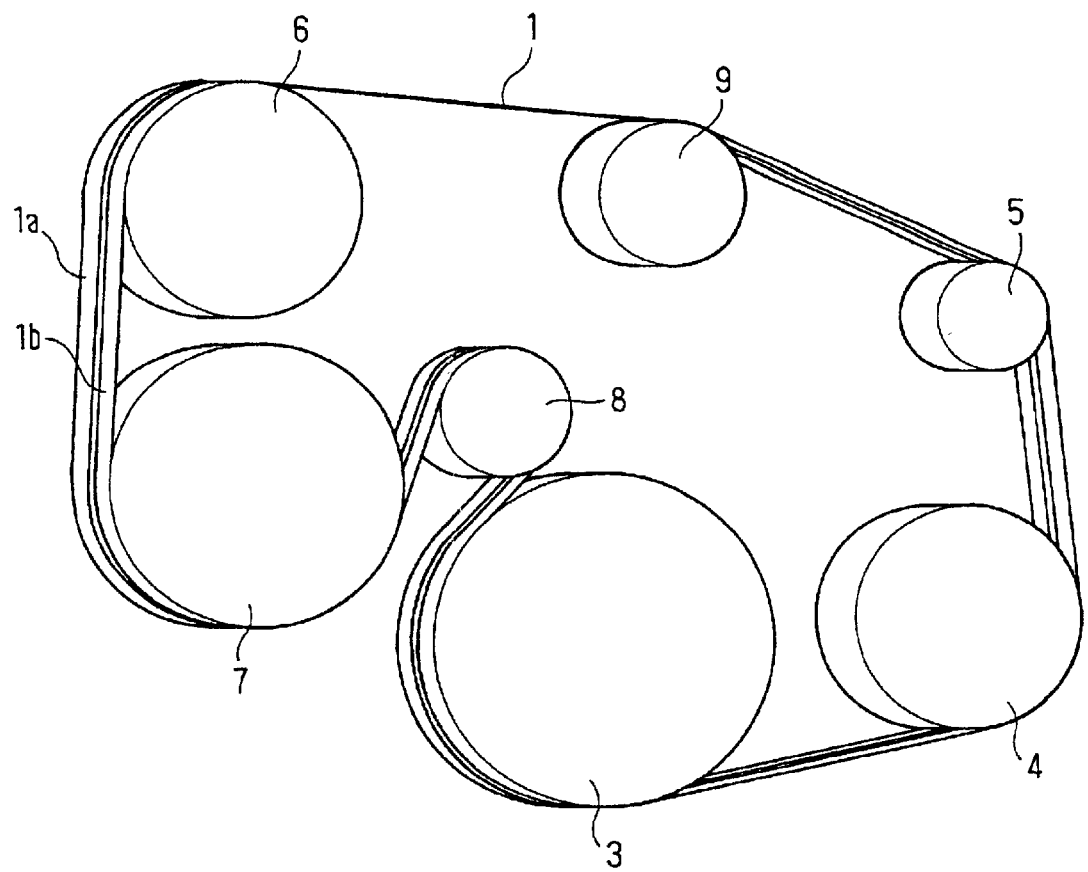
FIG. 1 is a schematic perspective view showing an entire structure of an engine auxiliary unit driving equipment according to a first embodiment of the present invention.

A first embodiment of the present invention is described with reference to FIGS. 1 to 3. FIG. 1 shows an entire structure of a serpentine type engine auxiliary unit driving equipment in which an engine driving force is transmitted from a crank pulley 3 to be fixed to an engine crankshaft (not shown), via a belt 1 composed of two pieces of poly-V belts 1a and 1b, to driven poly-V pulleys of various engine auxiliary units such as a poly-V pulley 4 of an air conditioner, a poly-V pulley 5 of an alternator, a poly-V pulley 6 of a power steering and a poly-V pulley 7 of a water pump pulley through driven poly-V pulleys such as an automatic tension adjusting poly-V pulley 8 and an idling poly-V pulley 9.

Figure 2:
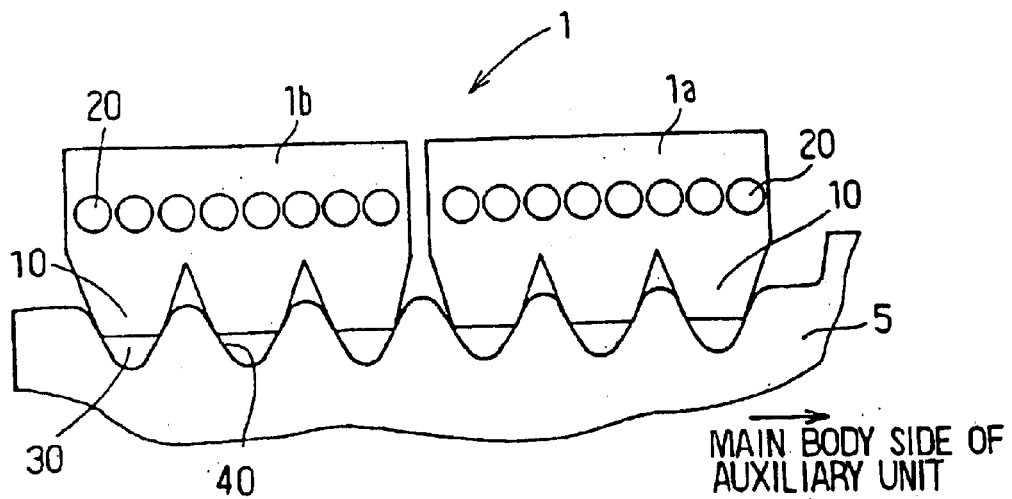
FIG. 2 is a cross sectional view taken along an axial direction of a poly-V pulley on which a poly-V belt is wound according to the first embodiment.
Figure 3:
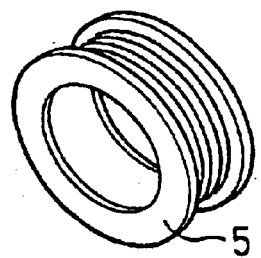
FIG. 3 is a perspective view of the one of the poly-V pulleys of FIG. 2.

As shown in FIG. 2, the two pieces of poly-V belts 1a and 1b are arranged in parallel. Each piece of the poly-V belts 1a or 1b, which is made of rubber, is provided with a plurality of projections 10 each extending in a longitudinal direction. A plurality of core wires 20, which extend in a longitudinal direction in parallel to each other and in parallel to each of the projections 10, are embedded in each piece of the poly-V belts 1a or 1b. Each of the driven poly-V pulleys 4 to 7 has six grooves 30 and is arranged at one end of each rotating axis of the engine auxiliary unite in a so called "overhang" state.

As exemplified in FIG. 2 which shows a cross sectional view taken along an axial direction of a poly-V pulley 5 of the alternator on which the belt 1 is put, the poly-V belt 1a has three projections 10 engaged with the three grooves 30 of each of the poly-V pulleys 4 to 7 on a width side near to each main body of the engine auxiliary units. On the other hand, the poly-V belt 1b has three projections 10 engaged with the three grooves 30 of each of the poly-V pulleys 4 to 7 on a width side far from each main body of the engine auxiliary units. After putting the two pieces of the poly-V belts 1a and 1b on the respective poly-V pulleys 4 to 7 of the engine auxiliary units and the idling pulley 9, tensions of the two pieces of the poly-V belts 1a and 1b are adequately regulated by the automatic tension adjusting poly-V pulley 8.

According to the engine auxiliary unit driving equipment mentioned above, tensile strength produced in each width direction of the poly-V belts $1a$ and $1b$ due to the overhang arrangement of each of the poly-V pulleys 4 to 7 is independent of each other. That is, the tensile strength is divided midway in a width direction between the two pieces of the poly-V belts $1a$ and $1b$ so that a crack hardly occurs in the poly-V belt $1a$ or $1b$, resulting in a longer lifetime of the poly-V belt $1a$ or $1b$. Further, natural frequency of the poly-V belt $1a$ or $1b$ around the poly-V pulley 5 of the alternator is shifted so as to restrict a belt flapping increase of the poly-V belt $1a$ or $1b$ at an idling time when the revolution fluctuation is larger.

Moreover, a pulley to pulley distance of the poly-V belt $1a$, which is varied slightly from time to time by belt tension, vibration, temperature and the like, is not always the same as that of the poly-V belt $1b$. The natural frequency of a belt is generally expressed by a formula mentioned below.

$$F=(\tfrac{1}{2}L) \times (t/\rho)^{1/2}$$

Where L: pulley to pulley distance

T: tension $\rho$: belt mass per unit length

Since there is little probability that the natural frequency of the poly-V belt $1a$ is the same as that of the poly-V belt $1b$, the flapping increases of the belts $1a$ and $1b$ due to simultaneous resonance thereof hardly take place at the same time. Accordingly, without using the conventional clutch pulley, the engine auxiliary unit driving equipment having a smaller number of component parts and their manufacturing processes can be realized at a lower cost.

Second Embodiment

A piece number of the grooves 30 of the poly-V pulley 5 according to the first embodiment is not limited to six (6) but may be seven (7) or more or may be less than seven, while a piece number of projections 10 of the poly-V belt 1 has projections corresponds to the piece number of the grooves 30. The grooves 30 are separated by a plurality of walls 40 between the grooves 30. In case of the seven or more grooves 30, a degree of overhanging out of the main body of the engine auxiliary unit as to the poly-V pulley 5 is more enhanced so that an advantage of using a plurality of pieces (two pieces) of the poly-V belt 1 divided in an axial direction of the poly-V pulley 5 is more distinct in view of bringing the longer lifetime of the belt 1. Even in case of the less than six grooves, if the poly-V pulley 5 is arranged at a more overhanging position due to a layout limitation of the engine auxiliary unit, the use of a plurality of pieces (two pieces) of the divided poly-V belts brings the same distinctive advantage as mentioned above.

Third Embodiment

Figure 4:
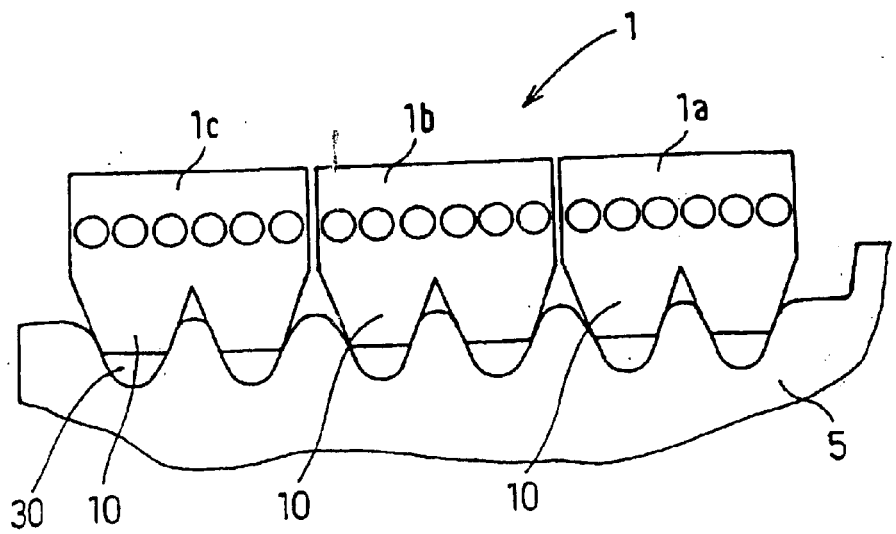
FIG. 4 is a cross sectional view taken along an axial direction of a poly-V pulley on which a poly-V belt is wound according to a third embodiment.

Instead of dividing the longitudinally extending projections 10 into two groups each having three projections in the first embodiment, the projections 10 may be divided into three groups each having two projections, as shown in FIG. 4. If the piece number of the grooves 30 of the poly-V pulley 5 is seven or more, seven or more numbers of the projections 10 of the poly-V belt 1 may be divided into more than three groups. Accordingly, the tensile strength produced in a width direction is divided midway between any adjacent two of the poly-V belts $1a$, $1b$ and $1c$ so that an advantage of preventing the crack of the belt is more distinct.

Fourth Embodiment

Figure 5A:
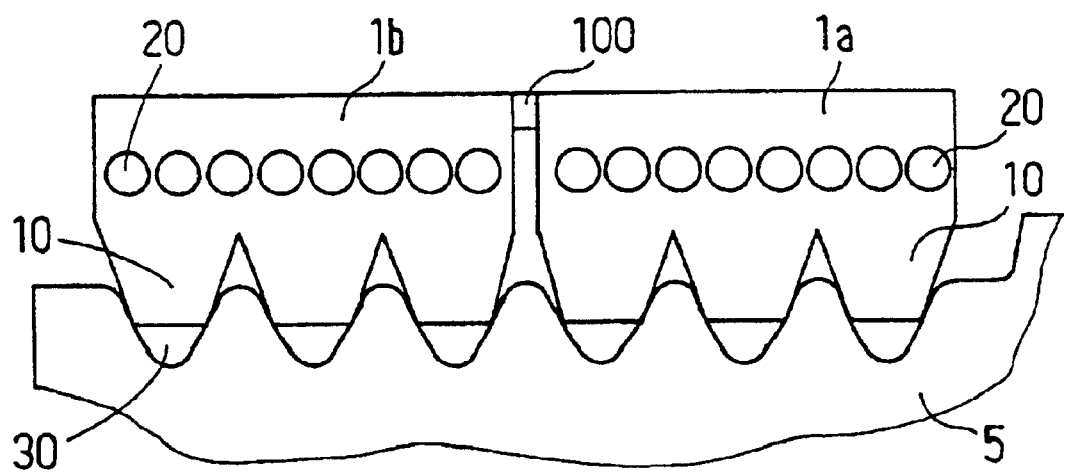
FIG. 5A is a cross sectional view taken along an axial direction of a poly-V pulley on which a poly-V belt is wound according to a fourth embodiment.
Figure 5B:
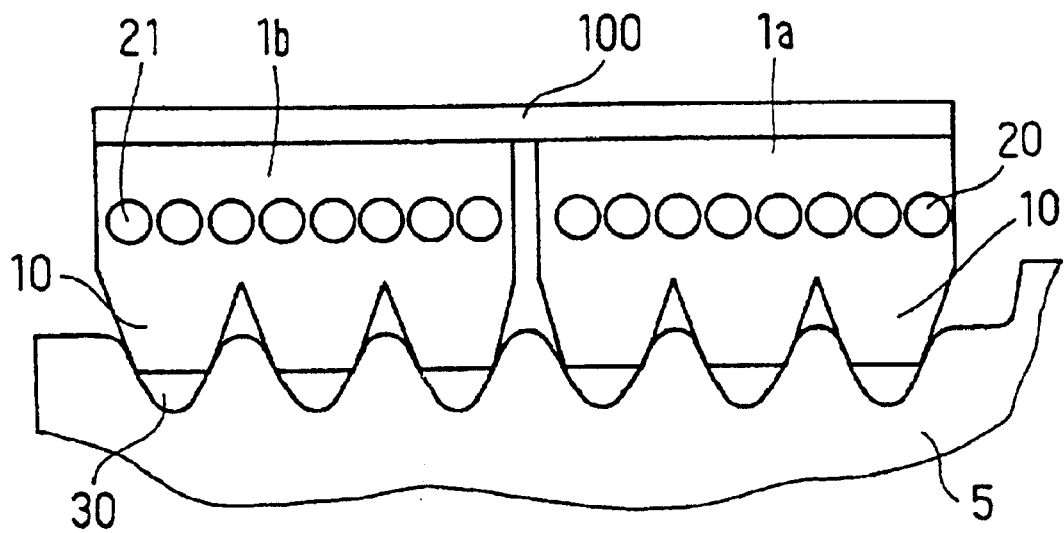
FIG. 5B is a cross sectional view taken along an axial direction of a poly-V pulley on which a poly-V belt is wound according to a modified embodiment of the fourth embodiment.

In addition to dividing the longitudinally extending projections 10 into two groups each having three projections in the first embodiment, side and/or top surfaces of the divided poly-V belts $1a$ and $1b$ may be connected with each other by a resilient member 100 which has no core wires and whose material stiffness is lower than that of the poly-V belt 1, as shown in FIGS. 5A and 5B. This construction serves not only to secure the longer lifetime of the poly-V belt 1 but also to easily put the poly-V belt 1 on the poly-V pulley 5, which results in a lower total manufacturing cost of the vehicle. The fourth embodiment may be combined with the third embodiment.

Fifth Embodiment

Figure 6:
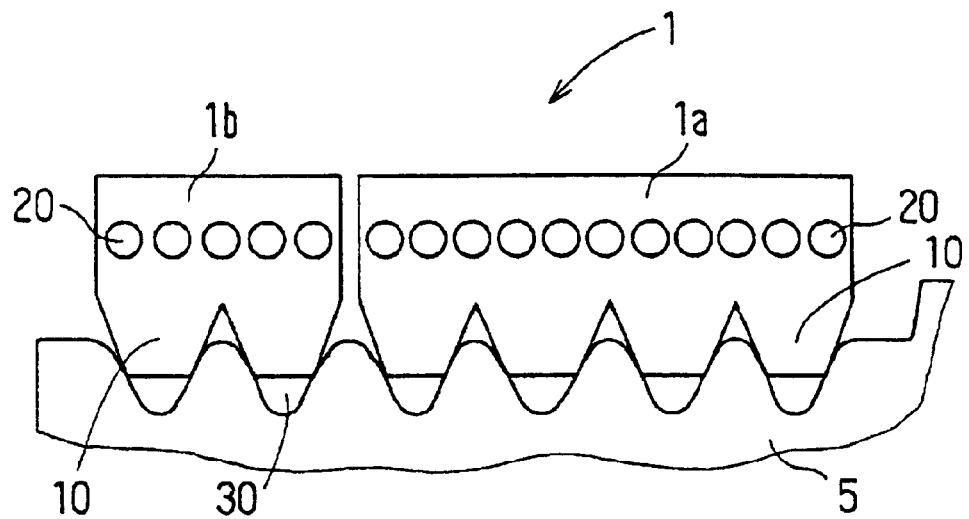
FIG. 6 is a cross sectional view taken along an axial direction of a poly-V pulley on which a poly-V belt is wound according to a fifth embodiment.

Instead of dividing the longitudinally extending projections 10 into two groups each having three projections in the first embodiment, the projections 10 may be divided into two groups, one group having two projections and the other group having four projections, as shown in FIG. 6. With this structure, mass per unit length of the respective pieces of the divided poly-V belts $1a$ and $1b$ are different from each other so that simultaneous resonance of the divided poly-V belts $1a$ and $1b$ are more unlikely to occur, as noted from the formula mentioned above as to the natural frequency of the belt. The fifth embodiment may be combined with any of the second to fourth embodiments.

Sixth Embodiment

Figure 7:
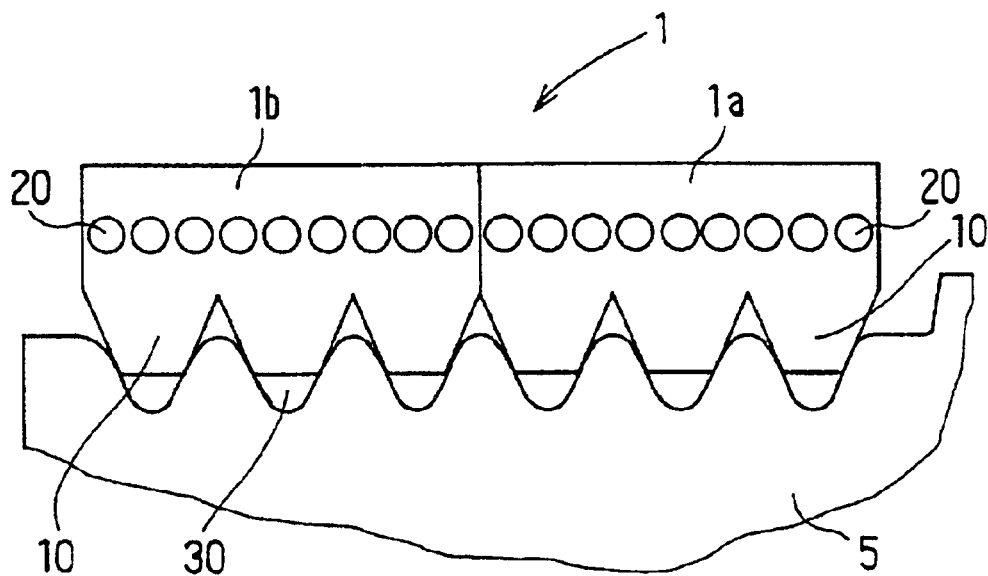
FIG. 7 is a cross sectional view taken along an axial direction of a poly-V pulley on which a poly-V belt is wound according to a sixth embodiment.

Though there is a gap between the respective confronting side surfaces of the divided poly-V belts $1a$ and $1b$ according to the first embodiment, the confronting side surfaces may come in contact with each other, as shown in FIG. 7. With this construction, when one of the divided poly-V belts $1a$ or $1b$ is about to flap and resonate, the other one of the divided poly-V belts $1b$ or $1a$ serves to restrict the resonance and flapping of the one of the divided poly-V belts $1a$ or $1b$ because of mutual frictional contact of the confronting side surfaces of the divided poly-V belts $1a$ and $1b$. That is, the divided poly-V belts $1a$ and $1b$ are operative to restrict mutual belt movements so that belt flapping and noises are restricted, resulting in a longer lifetime of the belt.

Figure 8:
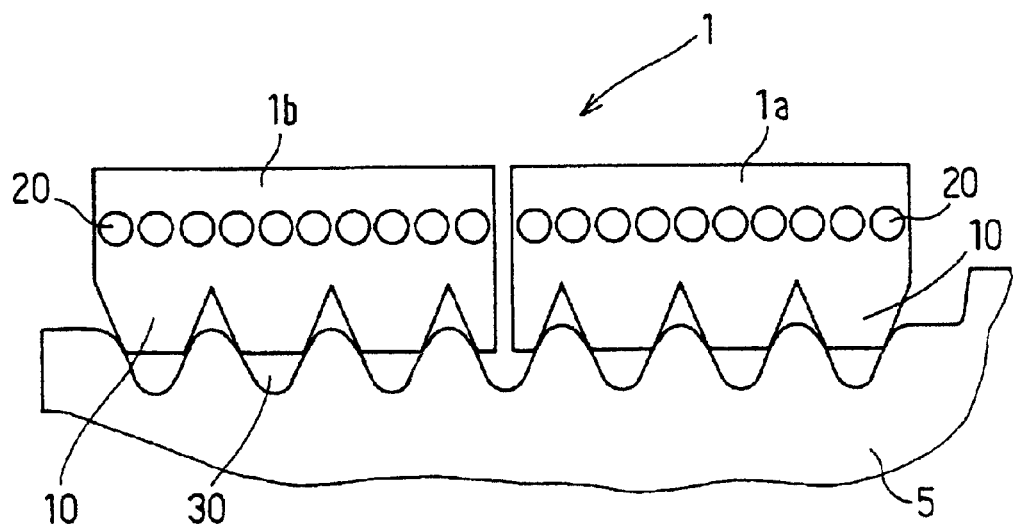
FIG. 8 is a cross sectional view taken along an axial direction of a poly-V pulley on which a poly-V belt is wound according to a seventh embodiment.
Figure 9:
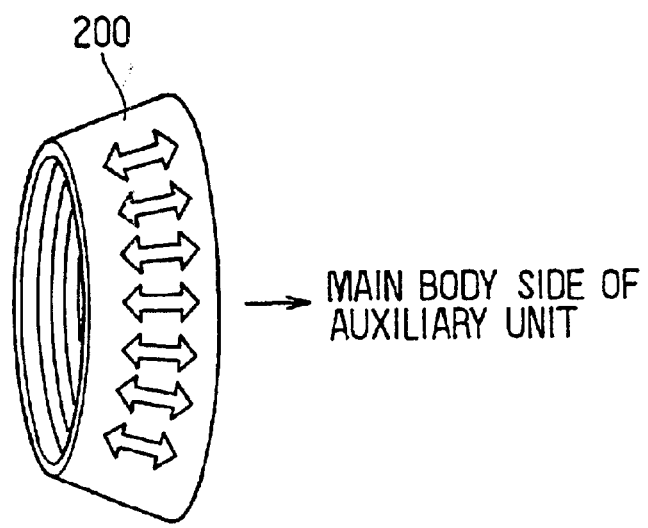
FIG. 9 is a schematic perspective view of a conventional poly-V belt put on poly-V pulleys as a prior art.

In place of dividing the poly-V belt 1 at and along a recess portion formed between any two of the longitudinally extending projections 10 in any one of the embodiment mentioned above, the poly-V belt 1 may be divided at and along any one of the longitudinally extending projections 10, as shown in FIG. 8. In particular, if the piece number of the grooves 30 of the poly-V pulley 5 is an odd number and the poly-V belt 1 is divided into two pieces, the divided poly-V belts $1a$ and $1b$ have the same shapes so that the poly-V belts $1a$ and $1b$ can be manufactured with a standardized forming die at less cost.

The belt construction shown in the embodiments mentioned above is applicable not only to the poly-V pulley 5 of the alternator but also to the poly-V pulley 4, 6, or 7 of the engine auxiliary units other than the alternator.

Further, on making a difference of each mass per unite length of the divided poly-V belts, each height of the divided poly-V belts in a thickness direction may be different in place of or in addition to dividing the belt 1 so as to make each piece number of the projections 10 of the divided poly-V pulleys different.

Furthermore, each longitudinal length of the divided poly-V belts or each piece number or thickness of the core wires of the divided poly-V belts may be different to vary each tension of the divided poly-V pulleys. With this construction, simultaneous resonance of the divided poly-V belts hardly occur, as noticed from the formula mentioned above as to the natural frequency of the poly-V belt, so that the belt noises are reduced and the belt lifetime is prolonged.

Moreover, the engine auxiliary unit driving equipment is not limited to the serpentine type as shown in the first embodiment but may be any type, for example, in which the crank pulley has multi-stages and respective stages of the crank pulley are connected to respective driven pulleys of the engine auxiliary units via a plurality of belts.

What is claimed is:

1. An engine auxiliary unit driving equipment for transmitting an engine driving force from a crank pulley fixed to an engine crankshaft to a plurality of engine auxiliary units, one of which is an alternator for a vehicle, comprising:

a unitary driven poly-V pulley, which is provided at least in the alternator, having at least six grooves extending in a circumferential direction and a plurality of walls between the grooves; and a poly-V belt having a top surface and, a plurality of projections extending in parallel in a longitudinal direction so as to respectively engage with the grooves of the driven poly-V pulley, said poly-V belt being bridged between the crank pulley and the driven poly-V pulley so that the engine driving force is transmitted to said alternator via the poly-V belt and the driven poly-V pulley, wherein the poly-V belt is composed of a plurality of pieces substantially divided in an axial direction of the driven poly-V pulley so that each piece of the poly-V belt has at least 2 and less than 6 of said projections and each of said walls is lower than said top surface and a portion of the side surfaces of the projections that directly face each other are disposed above said walls to allow confronting side surfaces of adjacent pieces of the belt to come into contact with each other.

2. An engine auxiliary unit driving equipment according to claim 1, wherein another of the engine auxiliary units other than the alternator is provided with another driven poly-V pulley on which the respective pieces of the poly-V belt are wound in parallel on the another driven poly-V pulley to position perpendicularly to the axial direction thereof so that the engine driving force is transmitted from the crank pulley, via the respective pieces of the poly-V belt, not only to the alternator but also to the another of the engine auxiliary units.

3. An engine auxiliary unit driving equipment according to claim 1, wherein the confronting side surfaces of any adjacent pieces of the divided poly-V belts come in contact with each other.

4. An engine auxiliary unit driving equipment according to claim 1, further comprising:

a resilient member with which the adjacent pieces of the divided poly-V belts are joined, stiffness of the resilient member being remarkably lower than that of the poly-V belt.

5. An engine auxiliary unit driving equipment according to claim 1, wherein respective longitudinal lengths of the divided poly-V belts are different.

6. An engine auxiliary unit driving equipment according to claim 1, wherein respective weights per unit length of the pieces of the poly-V belts are different.

7. An engine auxiliary unit driving equipment according to claim 1, wherein the number of projections on each of the plurality of pieces of the poly-V belt are different from each other.

8. An engine auxiliary unit driving equipment according to claim 1, wherein each of the plurality of pieces has a value of natural frequency that is shifted from the other.

* * * * *